UNITED STATES PATENT OFFICE.

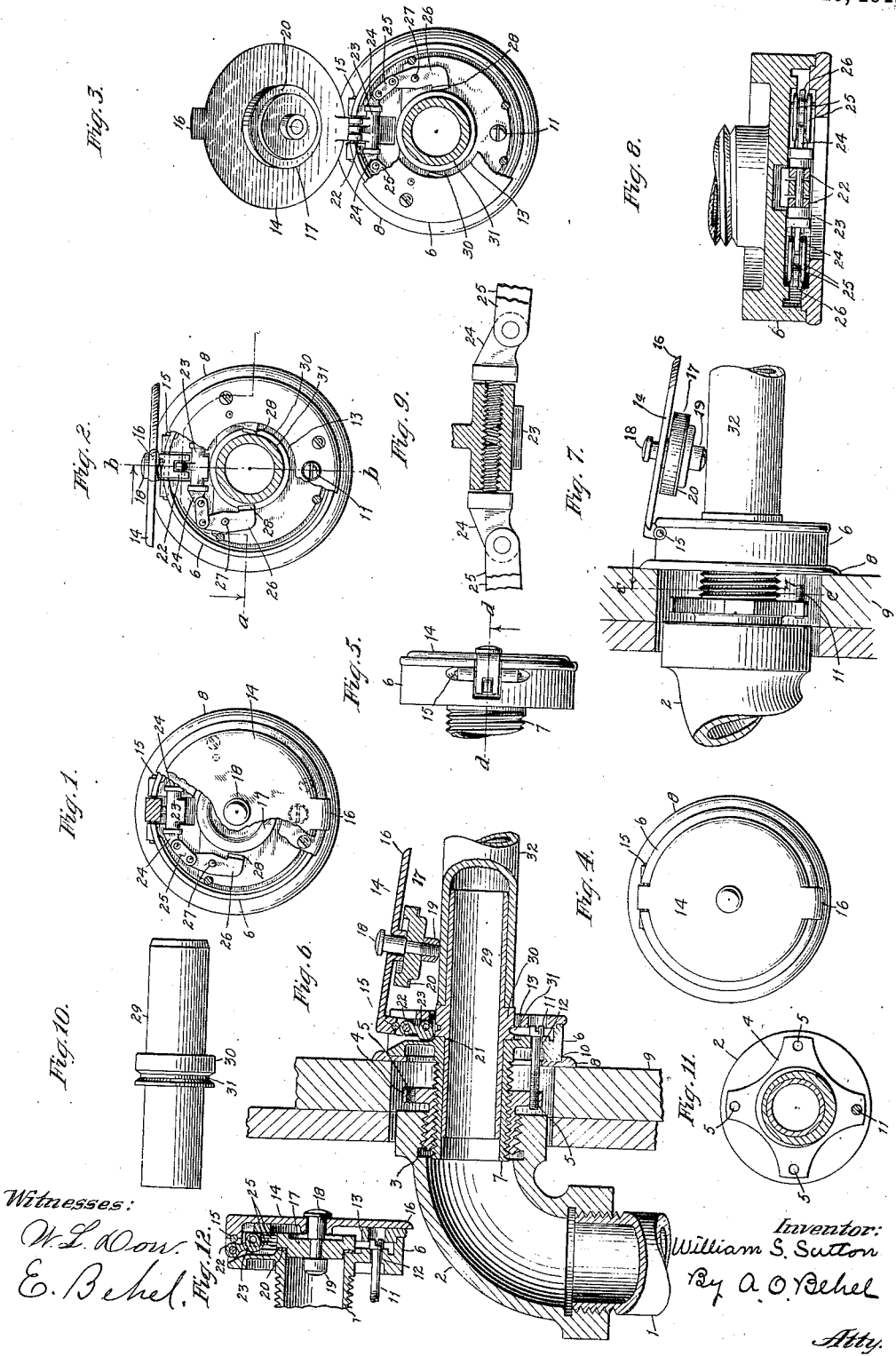

WILLIAM S. SUTTON, OF ROCKFORD, ILLINOIS, ASSIGNOR TO HOUSTON MANUFACTURING COMPANY, OF ROCKFORD, ILLINOIS, A CORPORATION OF ILLINOIS.

CLOSURE FOR AIR-SUCTION PIPES.

1,044,707.  Specification of Letters Patent.  Patented Nov. 19, 1912.

Application filed January 30, 1911. Serial No. 605,491.

*To all whom it may concern:*

Be it known that I, WILLIAM S. SUTTON, a citizen of the United States, residing at Rockford, in the county of Winnebago and State of Illinois, have invented certain new and useful Improvements in Closures for Air-Suction Pipes, of which the following is a specification.

The object of this invention is to construct a closure for air suction pipes employed in vacuum cleaning systems, in which the hose tube enters and a connection is made between the closure and hose tube to prevent its accidental removal.

In the accompanying drawings, Figure 1 is a face representation of the closure in which the cover is down and in which parts are broken away. Fig. 2 is a face representation of the closure in which the cover is half open, and in which parts are broken away. Fig. 3 is a face representation of the closure in which the cover is fully open, and in which parts are broken away. Fig. 4 is a face representation in which the cover is closed. Fig. 5 is a top view with the cover closed. Fig. 6 is a section on dotted line *b b* Fig. 2. Fig. 7 is a side elevation. Fig. 8 is a section on dotted line *a a* Fig. 2. Fig. 9 is an enlarged view and section of the connection of the extensions 24 with the rocking bar 23. Fig. 10 is a side view of the hose tube. Fig. 11 is a section on dotted line *c c* Fig. 7. Fig. 12 is a section on dotted line *d d* Fig. 5.

My improvements form a part of a vacuum cleaning system, and have to do with the coupling of the hose pipe with the wall socket in order that it may be locked when in use in connection therewith. The suction pipe 1 has an L 2 at its upper end. Within the L 2 is secured a bushing 3 provided with a flange 4 which has, in this instance, four screw threaded holes 5. A head 6 has a screw-threaded tubular extension 7, the screw fitted to turn in connection with the bushing 3. A washer 8 is placed against the wall 9 and has a recessed face 10. The head 6 is seated in the recess 10 of the washer and a screw 11 passes through the head and into one of the screw-threaded holes 5 of the bushing, thereby connecting the head to the bushing. By reason of the plurality of screw-threaded holes 5 in the bushing, and the bushing having a screw-thread connection with the L 2 the bushing can be adjusted to present one of the holes 5 in line with the hole 12 in the head so that the screw bolt 11 can properly connect with the bushing, thereby clamping the head firmly against the collar 8, and the collar against the face of the wall. The head 6 has its other face formed with a recess 13. A cover 14 has a hinge connection with the upper portion of the head by the pintle 15. This cover has a projection 16 by which it may be moved. To the inner face of this cover is secured a seat 17 which is held in place by the bolt 18 and nut 19. A leather facing 20 is supported by this seat. When the cover is closed the leather facing 20 will rest against the bottom 21 of the recess 13 in the face of the head, thereby closing the inlet of air to the pipe 1. If the valve 17 was rigidly secured to the covering 14 the adjustment of the parts would have to be exceedingly accurate in order to have the leather facing on the valve seat squarely in the recess or on the valve seat 13 and any strain on the cover resulting in even a slight disarrangement or irregularity of parts, would either partially or wholly destroy the function of the valve. The necessity for such fineness of adjustment or the effect of a minor irregularity or slight disarrangement of parts may be largely overcome by allowing the bolt 18 to have a limited sliding movement relative to the cover so that the valve seat may have a slight play toward or from the cover and thereby adapt itself to the recess or the valve seat 13, should there be any slight irregularity in the parts through workmanship or accident. This cover is held closed by the suction in the system. At the point of connection of this cover with the head is formed an extension 22, and to this extension is pivotally connected a rocking bar 23 in a manner that the opening and closing movements of the cover will reciprocate the rocking bar. Each end of this rocking bar has an extension 24 screw-threaded in connection therewith, and to each extension are pivotally connected double links 25. To the free ends of each pair of links 25 is pivoted a dog 26, and the dogs are pivotally connected by the stud 27 to the head 6. Each dog 26 has a V shaped end 28.

When the cover 14 is closed, the dogs are retracted and stand in the position shown at Fig. 1, and when the cover is fully open they are also retracted and stand in the position shown at Fig. 3. When the cover is half open the dogs are moved toward one another and will stand in the position shown at Fig. 2.

The hose connection comprises the tube 29 provided with a central enlargement 30 which has a V shaped annular groove 31. One end of this tube is received within the flexible hose 32. In placing the hose connection within the head 6, the cover 14 is raised full open, which will hold the dogs retracted and allow of the insertion of the tube within the head and within the extension 7 of the head until the end of the central enlargement 30 rests against the seat 21. The cover 14 is then dropped into the position shown at Figs. 2, 6 and 7 which will allow the dogs 26 to enter the V shaped groove 31, thereby locking the tube 29 against withdrawal. Upon raising the cover 14, the dogs will be withdrawn from their engagement with the tube which will allow of the withdrawal of the tube.

In use, the operation of manipulating the cleaning tools considerable strain is exerted on the tube which is liable to withdraw it from its engagement with the head 6, if the locking means were not employed.

I claim as my invention.

1. A closure for suction pipes comprising a head adapted to be connected with a suction pipe, a cover for the head, a suction tube, and a part independent of the cover and movable by the cover into and out of engagement with the suction tube.

2. A closure for suction pipes, comprising a head adapted to be connected with a suction pipe, a cover for the head, a suction tube, and a dog movable by the cover into and out of engagement with the suction tube.

3. A closure for suction pipes, comprising a head adapted to be connected with a suction pipe, a cover for the head, a suction tube, and dogs movable by the cover into and out of engagement with the suction tube.

4. A closure for suction pipes, comprising a head adapted to be connected with a suction pipe, a cover for the head, a suction tube provided with an annular groove, and a dog movable by the cover into and out of engagement with the annular groove of the suction tube.

5. A closure for suction pipes, comprising a head adapted to be connected with a suction pipe, a cover for the head, a suction tube provided with an annular groove, and two dogs located opposite one another and movable by the cover into and out of engagement with the annular groove of the suction tube.

6. A closure for suction pipes comprising a head adapted to be connected with a suction pipe, a hinged cover for the head, a suction tube, and pivoted dogs movable by the cover into and out of engagement with the suction tube.

7. A closure for suction pipes, comprising a head adapted to be connected with a suction pipe, a hinged cover for the head, a suction tube, pivoted dogs, links connecting the cover and dogs so that the movement of the cover will move the dogs into and out of engagement with the suction tube.

8. A closure for suction pipes, comprising a suction pipe, a screw-threaded bushing in the pipe provided with a plurality of screw-threaded holes, a head having a screw-threaded tubular extension which is turned in connection with the bushing, a screw connecting the head with one of the screw-threaded holes and a cover for the head.

9. A closure for suction pipes comprising a head adapted to be connected with a suction pipe and provided with a suction opening, a cover for the suction opening hinged to the head and adapted to bear against the head when in closed position, a center stud slidably connected with the cover and a seat connected with the stud and adapted to accommodate itself to close the end of the suction opening in the head.

In testimony whereof I have hereunto set my hand in presence of two subscribing witnesses.

WILLIAM S. SUTTON.

Witnesses:
A. O. BEHEL,
E. D. E. N. BEHEL.